March 20, 1951 — F. A. THIEL, JR — 2,545,562
SHAFT COUPLING
Filed July 24, 1946
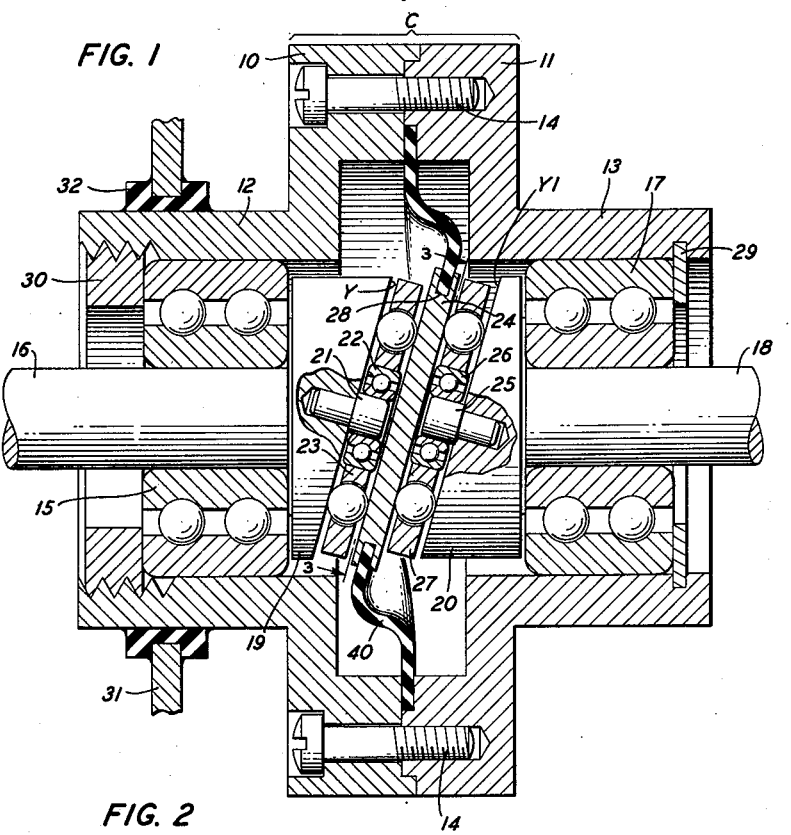
FIG. 1
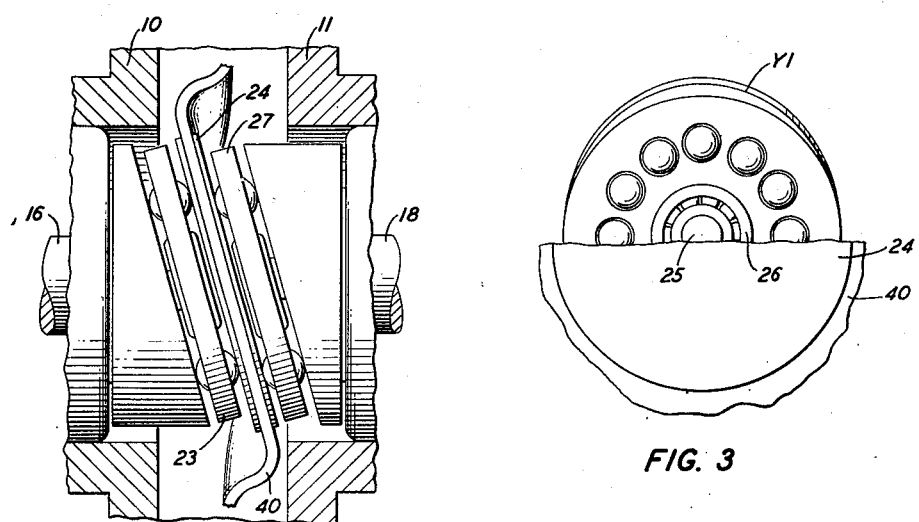
FIG. 2
FIG. 3
INVENTOR
F. A. THIEL, JR.
BY J. MacDonald
ATTORNEY Patented Mar. 20, 1951

2,545,562

UNITED STATES PATENT OFFICE 2,545,562

SHAFT COUPLING

Felix A. Thiel, Jr., Jackson Heights, N. Y., assignor to Bell Telephone Laboratories, Incorporated, New York, N. Y., a corporation of New York Application July 24, 1946, Serial No. 685,960

2 Claims. (Cl. 286—29)

This invention relates to shaft couplings and more specifically to a type of coupling in which a barrier member is positioned between a driving and a driven shaft for preventing moisture or other elements reaching the driven shaft and the apparatus operatively connected thereto.

Most of the failures encountered in electrical apparatus used in field services, for example, have been found to be due to moisture, gases and similar extraneous elements reaching the interior of the casing housing the apparatus through the necessary clearance between the driving shaft and its supporting bearing.

The object of the present invention is the provision of a coupling for operatively connecting a driving and a driven shaft in positive angular relation to each other, which will effectively prevent the entrance of moisture into the casing housing the apparatus actuated by the driving shaft and which will be simple in construction and cheap to manufacture.

In the drawing,

Fig. 1 is an assembly view shown with a number of operating parts in longitudinal vertical section;

Fig. 2 is a partial view shown with the connected shafts and a number of operating parts 90 degrees from the position shown in Fig. 1; and Fig. 3 is a sectional view taken on line A—A of Fig. 1 looking in the direction indicated by the arrows in that figure.

According to the shaft coupling of this invention, a casing C shown in Figs. 1 and 2 is formed of two detachable cylindrical sections 10 and 11 formed with hub portions 12 and 13, respectively, the sections 10 and 11 being held in assembled relation to each other by a plurality of screws 14.

A ball bearing 15 fitted into the hub portion 12 of casing section 10 is provided for rotatably supporting a shaft 16 which may be, for example, the driving shaft of an electrical or mechanical apparatus, not shown. Similarly a ball bearing 17 which has its outer disposed race fitted into the hub portion 13 of casing section 11 is provided for rotatably supporting a shaft 18 which may be the driven shaft connecting with the electrical apparatus in coaxial alignment relative to shaft 16. Shafts 16 and 18 are each provided with an enlarged portion 19 and 20, respectively, the adjacent sides Y and Y1 of which are formed obliquely relative to the plane of rotation of the portions 19 and 20 to form clutch elements as will be hereinafter described in detail.

The enlarged portion 19 of shaft 16 carries a spindle 21 disposed perpendicularly to the oblique surface Y of enlarged portion 19 for mounting a ball bearing 22 while on the outer disposed ring of this ball bearing is mounted an end thrust bearing 23 engaging the oblique surface Y of enlarged portion 19 and one side of the steel hardened disc 24. Similarly the enlarged portion 20 of shaft 18 carries a spindle 25 perpendicular to its oblique surface Y1 provided for mounting a ball bearing 26 best seen in Figs. 1 and 3 on which is rotatably mounted an end thrust bearing 27, the balls of which engage the oblique surface Y1 of enlarged portion 20 and the opposite side of disc 24.

A ring 40 of flexible material, such as rubber, as shown in Fig. 1, has its peripheral edge vulcanized between the sections 10 and 11 of casing C while its inner edge is vulcanized in a circular groove 28 formed at the periphery of disc 24 to form a barrier between the sections 10 and 11 of casing C and thereby between the driving shaft 16 and the driven shaft 18, while holding the disc 24 against rotation as would be imparted to it by the friction of ball bearings 23 and 27 during the rotation of shafts 16 and 18 but permitting the wobbling movement of this disc from the position shown in Fig. 1 to the position shown in Fig. 2, 180 degrees from the position in Fig. 1. A ring 29 fitted in an interiorly disposed circular groove in the hub portion 13 of casing section 11 serves as a stop for the outer disposed ring of ball bearing 17 upon the tightening of a nut ring 30 threadedly engaging the inner periphery of hub portion 12 for the so-called preloading of the ball bearings 15 and 17 and thereby the end thrust bearings 23 and 27 against the disc 24 and the oblique surfaces Y and Y1 of enlarged portion or clutch elements 19 and 20.

In the operation of the coupling of this invention rotation of shaft 16 is imparted to shaft 18 by the wedging action of the oblique surface Y on the end thrust bearing 23, the disc 24, the end thrust bearing 27, the latter engaging the oblique surface Y1 of enlarged portion 20 formed with or carried by shaft 18. This wedging action is similar to that which would take place by the pressing of the two oblique surfaces Y and Y1 directly against each other, the end thrust bearings 23 and 27, however, permitting the use of the non-rotating disc 24, and the resilient ring or barrier 40 to form a seal separating the two sections 10 and 11 of the casing and the shafts 16 and 18.

In actual use the coupling is supported by a wall 31 of the casing housing the apparatus, not shown, while a rubber ring 32 is vulcanized to the wall 31 and to the hub portion 12 of section 10 so as to form a positive seal therebetween at that point.

What is claimed is:

1. In a shaft coupling, a two part casing, a driving and a driven shaft mounted in said casing in coaxial relation to each other, a clutch element carried by each of said shafts disposed in spaced relation to each other, and having oblique opposing surfaces, a stud extending from each of said surfaces, ball-bearings mounted on said studs and having thrust bearings rotatably mounted thereon, said thrust bearings engaging said clutch elements, a disc disposed between said end thrust bearings, a ring of flexible material secured at its periphery between the two ports of said casing and secured centrally to said disc for holding the latter against rotation, and means in said casing for forcing said clutch elements, said bearing and said disc into cooperating engagement, said flexible ring permitting the wobbling motion of said disc upon the rotation of said shafts.

2. In a shaft coupling, a casing made of two detachable sections, a driving and a driven shaft rotatably mounted in said sections in coaxial relation to each other, means carried by said shafts having oblique disposed surfaces forming complemental clutch elements disposed in spaced relation to each other, a stud extending laterally from each of said oblique surfaces and an end thrust bearing mounted for rotation on each of said studs and engaging said oblique surfaces, a non-rotatable disc disposed between said end thrust bearings, a ring of flexible material having its periphery secured between said casing sections and its central portion secured to said disc to form a seal between said sections, and means for forcing said shafts, said end thrust bearings and said disc in contacting relation to each other.

FELIX A. THIEL, Jr.

REFERENCES CITED

The following references are of record in the file of this patent:

UNITED STATES PATENTS

| Number | Name | Date |
|---|---|---|
| 2,065,834 | Swennes | Dec. 29, 1936 |
| 2,119,955 | Litton | June 7, 1938 |
| 2,323,569 | Rzeppa | July 6, 1943 |
| 2,395,843 | Brown | Mar. 5, 1946 |

FOREIGN PATENTS

| Number | Country | Date |
|---|---|---|
| 347,676 | Great Britain | of 1931 |